United States Patent
Colignon

(10) Patent No.: US 7,694,511 B2
(45) Date of Patent: Apr. 13, 2010

(54) SYSTEM FOR CONTROLLING DEPOLLUTION MEANS REGENERATION

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 0 days.

(21) Appl. No.: 11/571,262

(22) PCT Filed: Jun. 22, 2005

(86) PCT No.: PCT/FR2005/050479

§ 371 (c)(1), (2), (4) Date: Dec. 22, 2006

(87) PCT Pub. No.: WO2006/005877

PCT Pub. Date: Jan. 19, 2006

(65) Prior Publication Data

US 2008/0010978 A1    Jan. 17, 2008

(30) Foreign Application Priority Data

Jun. 23, 2004    (FR) .................................. 04 06867

(51) Int. Cl.
*F01N 3/00* (2006.01)
(52) U.S. Cl. ............... 60/295; 60/286; 60/297; 60/301; 60/311
(58) Field of Classification Search ........... 60/280, 60/286, 295, 297, 301, 311, 274
See application file for complete search history.

(56) References Cited

U.S. PATENT DOCUMENTS

| | | | |
|---|---|---|---|
| 4,665,690 A | 5/1987 | Nomoto et al. | |
| 5,121,601 A | 6/1992 | Kammel | |
| 5,207,990 A | 5/1993 | Sekiya et al. | |
| 5,511,413 A | 4/1996 | Pfister et al. | |
| 6,325,041 B1 | 12/2001 | Mamiya et al. | |
| 6,438,948 B2 * | 8/2002 | Ono et al. | 60/311 |
| 6,594,989 B1 | 7/2003 | Hepburn et al. | |
| 6,708,487 B2 | 3/2004 | Morimoto et al. | |

(Continued)

FOREIGN PATENT DOCUMENTS

DE    19906287 A1    8/2000

(Continued)

OTHER PUBLICATIONS

Bunting, A, "Springing the trap", Automotive Engineer, Mechanical Engineering Publ. Ltd. Bury St. Edmunds, GB, pp. 73-73, May 2000.

(Continued)

*Primary Examiner*—Binh Q Tran
(74) *Attorney, Agent, or Firm*—Nicolas E. Seckel

(57) ABSTRACT

The inventive system for controlling the regeneration of depollution means (1) which is integrated into the exhaust line (2) of a motor vehicle engine (3) and is associated with a common rail fuel supply means for carrying out the depollution means regeneration strategies (6) by using the fuel post-injections into the engine cylinders, wherein said system also comprises, for each regeneration, means (7) for calculating a total time spent in different regeneration strategies and means (8) for comparing said total time with a maximum threshold value (9) in order to stop the regeneration when said threshold is exceeded.

20 Claims, 1 Drawing Sheet

U.S. PATENT DOCUMENTS

| | | |
|---|---|---|
| 6,851,258 B2 * | 2/2005 | Kawashima et al. .......... 60/311 |
| 6,901,751 B2 | 6/2005 | Bunting et al. |
| 6,948,311 B2 * | 9/2005 | Schaller et al. .............. 60/286 |
| 7,017,337 B2 | 3/2006 | Plote et al. |
| 7,104,051 B2 * | 9/2006 | Shimasaki et al. ........... 60/297 |
| 7,121,083 B2 | 10/2006 | Ishibashi et al. |
| 7,134,275 B2 | 11/2006 | Tsutsumoto et al. |
| 7,137,247 B2 * | 11/2006 | Koga et al. .................... 60/295 |
| 7,159,384 B2 * | 1/2007 | Otake et al. ................... 60/277 |
| 7,181,909 B2 * | 2/2007 | Sato et al. ..................... 60/297 |
| 7,310,941 B2 * | 12/2007 | Kuboshima et al. .......... 60/297 |
| 2002/0112472 A1 | 8/2002 | Tashiro et al. |
| 2002/0175212 A1 | 11/2002 | Hepburn et al. |
| 2003/0033800 A1 | 2/2003 | Tonetti et al. |
| 2003/0089102 A1 | 5/2003 | Colignon |
| 2003/0106309 A1 | 6/2003 | Morimoto et al. |
| 2003/0131592 A1 | 7/2003 | Kinugawa et al. |
| 2003/0172642 A1 | 9/2003 | Nakatani et al. |
| 2003/0230077 A1 | 12/2003 | Kuboshima et al. |
| 2003/0230079 A1 | 12/2003 | Kuboshima et al. |
| 2004/0000139 A1 | 1/2004 | Kawashima et al. |
| 2004/0016227 A1 | 1/2004 | Kitahara |
| 2004/0035101 A1 | 2/2004 | Imai et al. |
| 2004/0055285 A1 | 3/2004 | Rohr et al. |
| 2004/0074225 A1 | 4/2004 | Schaller et al. |
| 2007/0157818 A1 | 7/2007 | Colignon |
| 2007/0245721 A1 | 10/2007 | Colignon |
| 2007/0261389 A1 | 11/2007 | Colignon |
| 2008/0016854 A1 | 1/2008 | Colignon |
| 2008/0041039 A1 | 2/2008 | Colignon |
| 2008/0059040 A1 | 3/2008 | Colignon |
| 2008/0066445 A1 | 3/2008 | Colignon |

FOREIGN PATENT DOCUMENTS

| | | | |
|---|---|---|---|
| DE | 19952830 | A1 | 5/2001 |
| EP | 0349788 | A1 | 1/1990 |
| EP | 0708809 | B | 9/2000 |
| EP | 1041262 | A | 10/2000 |
| EP | 1072763 | A1 | 1/2001 |
| EP | 1108862 | A2 | 6/2001 |
| EP | 1130230 | A1 | 9/2001 |
| EP | 1134397 | A2 | 9/2001 |
| EP | 1234959 | A2 | 8/2002 |
| EP | 1281843 | A | 2/2003 |
| EP | 1281852 | A | 2/2003 |
| EP | 1281852 | A1 | 2/2003 |
| EP | 1310656 | A1 | 5/2003 |
| EP | 1321642 | A1 | 6/2003 |
| EP | 1375877 | A2 | 1/2004 |
| EP | 1386656 | A1 | 2/2004 |
| EP | 1400663 | A2 | 3/2004 |
| EP | 1405999 | A1 | 4/2004 |
| FR | 2771449 | A1 | 5/1999 |
| FR | 2774421 | A | 8/1999 |
| FR | 2781251 | A1 | 1/2000 |
| FR | 2801635 | A | 6/2001 |
| FR | 2801636 | A | 6/2001 |
| FR | 2802572 | A | 6/2001 |
| FR | 2802972 | A1 | 6/2001 |
| FR | 2809767 | A1 | 12/2001 |
| FR | 2811370 | A1 | 1/2002 |
| FR | 2828234 | A1 | 2/2003 |
| FR | 2829798 | A1 | 3/2003 |
| FR | 2835566 | A1 | 8/2003 |
| FR | 2836956 | A1 | 9/2003 |
| FR | 2872215 | B1 | 11/2006 |
| FR | 2820462 | A1 | 7/2008 |
| JP | 62159713 | A | 7/1987 |
| JP | 63120812 | A | 5/1988 |
| WO | 01/51779 | A1 | 7/2001 |
| WO | 02/075138 | A1 | 9/2002 |
| WO | 2006005862 | A1 | 1/2006 |
| WO | 2006005863 | A1 | 1/2006 |
| WO | 2006005865 | A1 | 1/2006 |
| WO | 2006005866 | A1 | 1/2006 |
| WO | 2006005867 | A1 | 1/2006 |
| WO | 2006005870 | A1 | 1/2006 |

OTHER PUBLICATIONS

Bunting, "Springing the Trap," Automotive Engineer, Mechanical Engineering Pub. Ltd, Bury St Edmunds, UK, vol. 25, No. 5, May 2000, pp. 73-74 (cited in ISR of Foreign Pat Pub #1, #2, #3, #6, cited in ISR made of record in US Pat Pub #4, #6, #8).

"Diesel Fuel Regeneration," Dieselnet Technology Guide, Jul. 2001 (cited in iSR of Foreign Pat Pub #1, #2, #3, cited in ISR made of record in US Pat Pub #6).

* cited by examiner

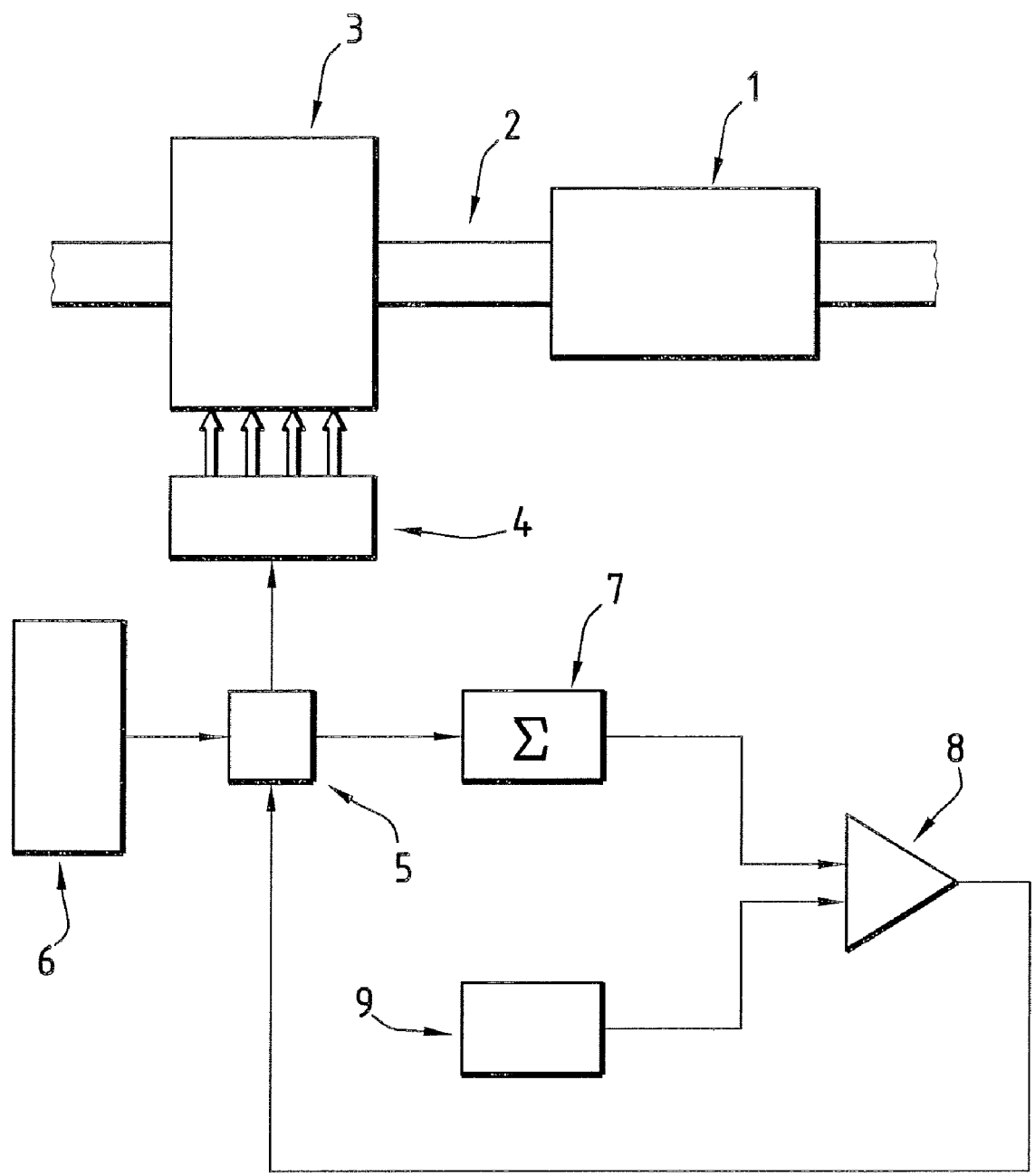

SYSTEM FOR CONTROLLING DEPOLLUTION MEANS REGENERATION

BACKGROUND ART

The present invention concerns a system for controlling the regeneration of depollution means integrated in an exhaust line of a motor vehicle engine.

More particularly, the invention relates to such a system in which the engine is associated with common rail means for the supply of fuel to the cylinders thereof, according to at least one post-injection.

Such a post-injection is, in a standard manner, an injection of fuel after the high dead center of the cylinder under consideration.

These supply means are adapted to implement, at constant torque, through modification of parameters for controlling the operation of the engine, different regeneration strategies making it possible to obtain different thermal levels in the exhaust line.

Thus, for example, supply means implementing regeneration strategies called normal strategy, level 1 strategy, level 2 strategy and/or over-calibrated level 2 strategy, have already been proposed.

Indeed, it is known that, to ensure the regeneration of depollution means, such as a particle filter, the soot trapped therein are burned thanks to the thermal energy provided by the engine and to the exotherm obtained by the conversion of the HC and of the CO on means forming oxidation catalyst, placed, for example, upstream of the particle filter.

This combustion can be assisted by a catalyzing element, mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

However, the use of post-injections generates a dilution of the lubrication oil of the engine by the fuel, which degrades the lubrication properties thereof, and translates in particular into a reduction of the viscosity which can lead, if this viscosity is too low, to engine breakage.

SUMMARY OF THE INVENTION

The objective of the invention is thus to remedy these problems.

To this effect, an object of the invention is a system for controlling the regeneration of depollution means integrated in an exhaust line of a motor vehicle engine, associated with common rail means for the supply of fuel, adapted to implement strategies for the regeneration of the depollution means, using post-injections of fuel into the cylinders of the engine, characterized in that it comprises further, for each regeneration, means for calculating the cumulated time passed in the different regeneration strategies, and means for comparing this cumulated time with a maximal threshold value, to cut the regeneration in the case where this threshold value has been exceeded.

According to other characteristics:
the times passed in the different regeneration strategies are weighed with different coefficients;
the depollution means comprise a particle filter;
the particle filter is catalyzed;
the depollution means comprise a NOx trap;
the fuel comprises an additive intended to be deposited, with the particles with which it is mixed, on the depollution means to facilitate their regeneration;
the fuel comprises an additive forming NOx trap;
the depollution means are impregnated with an SCR formulation ensuring a CO/HC oxidation function; and
the engine is associated with a turbo-compressor.

BRIEF DESCRIPTION OF THE DRAWINGS

The invention will be better understood by reading the following description, given by way of example only and made in reference to the annexed drawing which is a synoptic schematic view illustrating the general structure and the operation of a control system according to the invention.

DETAILED DECRIPTION OF PARTICULAR EMBODIMENTS

Indeed, this FIGURE shows a system for controlling the regeneration of depollution means designated by the general reference 1, integrated in the exhaust line 2 of a motor vehicle engine 3.

This engine can be, for example, a motor vehicle diesel engine, the depollution means comprising, for example, a particle filter or others, associated with means forming oxidation catalyst or others, as is already known in the state of the art.

This engine is associated with common rail means for the supply of fuel, designated by the general reference 4 on this FIGURE, adapted to implement, under the control, for example, of a computer designated by the general reference 5, regeneration strategies of the depollution means, by using post-injections of fuel into the cylinders of the engine.

The different strategies are, for example, stored in memorization means designated by the general reference 6 and associated with the computer 5.

According to the invention, this system also comprises, for each regeneration of the depollution means, means for calculating the cumulated time passed in the different regeneration strategies, designated by the general reference 7 on this FIGURE, and means 8 for comparing this cumulated time to a maximal threshold value established, for example, by corresponding means 9, to cut the regeneration in the case this threshold value is exceeded.

The means 7 for calculating the cumulated time are also, for example, adapted to affect different coefficients to the times passed during the regeneration, in the different strategies.

Thus, the coefficients with which the times passed in normal, level 1, level 2, and/or over-calibrated level 2 regeneration strategies are weighed can be different to take into account the more or less important dilution of the oil during application of these different strategies.

Different coefficients can also be used depending on the state of the engine (for example, raised foot, idling, or loaded engine), which multiplies the number of coefficients by level.

Such a system makes it then possible to maintain within admissible limits the dilution level of the oil, by controlling it by using a counter of effective post-injection time and by cutting it when the threshold value is reached, in order to avoid any additional dilution, to make it possible for the fuel to evaporate, and avoid engine breakage.

Of course, other embodiments can be envisioned, and in particular, different embodiments of the depollution means can be provided.

Thus, for example, the depollution means and the means forming oxidation catalyst can be integrated into a single and same element, in particular, on a same substrate.

By way of example, a particle filter integrating the oxidation function can be envisioned.

Similarly, a NOx trap integrating such an oxidation function can also be envisioned, whether it is additivized or not.

This oxidation and/or NOx trap function can be fulfilled, for example, by an additive mixed with the fuel.

In that case, the fuel can indeed comprise an additive intended to be deposited, with the particles with which it is mixed, on the depollution means to facilitate their regeneration.

Similarly, the engine can be associated or not to a turbo-compressor.

The invention claimed is:

1. System for controlling the regeneration of depollution means integrated in an exhaust line of a motor vehicle engine, associated with common rail means for the supply of fuel, adapted to implement strategies for the regeneration of the depollution means, using post-injections of fuel into the cylinders of the engine, wherein different strategies provide different thermal levels in the exhaust line, each regeneration having a duration as a function of said strategies, wherein the higher the thermal levels in the exhaust line, the shorter the duration of the regeneration, wherein said system comprises further, for each regeneration:

means for calculating a weighted cumulated time passed in the different regeneration strategies during said regeneration, wherein the weighted cumulated time is a sum of the weighted times passed in the different regeneration strategies during said regeneration, each of said weighed times passed in the different regeneration strategies being the respective time passed in the respective regeneration strategy weighted with a respective weighting coefficient, wherein the times passed in the different regeneration strategies are weighted with different weighting coefficients in calculating the weighted cumulated time during said regeneration, and means for comparing this weighted cumulated time with a set maximal threshold value for said regeneration, wherein (i) said regeneration is performed for said duration in the case where this threshold value has not been exceeded, and (ii) said regeneration is cut before an end of said duration in the case where this threshold value has been exceeded.

2. System according to claim 1, wherein the depollution means comprise a particle filter.

3. System according to claim 2, wherein the particle filter is catalyzed.

4. System according to claim 1, wherein the depollution means comprise a NOx trap.

5. System according to claim 1, wherein the fuel comprises an additive intended to be deposited, with the particles with which it is mixed, on the depollution means to facilitate their regeneration.

6. System according to claim 1, wherein the fuel comprises an additive forming NOx trap.

7. System according to claim 1, wherein the depollution means are impregnated with an SCR formulation ensuring a CO/HC oxidation function.

8. System according to claim 1, wherein the engine is associated with a turbo-compressor.

9. Method of controlling the regeneration of depollution means integrated in an exhaust line of a motor vehicle engine, associated with common rail means for the supply of fuel, said method comprising:

implementing strategies for the regeneration of the depollution means, using post-injections of fuel into the cylinders of the engine, wherein different strategies provide different thermal levels in the exhaust line, each regeneration having a duration as a function of said strategies, wherein the higher the thermal levels in the exhaust line, the shorter the duration of the regeneration, and, for each regeneration:

calculating a weighted cumulated time passed in the different regeneration strategies during said regeneration, wherein the weighted cumulated time is a sum of the weighted times passed in the different regeneration strategies during said regeneration, each of said weighted times passed in the different regeneration strategies being the respective time passed in the respective regeneration strategy weighted with a respective weighting coefficient, wherein the times passed in the different regeneration strategies are weighted with different weighting coefficients in calculating the weighted cumulated time during said regeneration, comparing this weighted cumulated time with a set maximal threshold value for this regeneration, and at least one of (i) performing said regeneration for said duration in the case where this threshold value has not been exceeded, and (ii) cutting said regeneration before an end of said duration in the case where this threshold value has been exceeded.

10. Method according to claim 9, wherein the depollution means comprise a particle filter.

11. Method according to claim 10, wherein the particle filter is catalyzed.

12. Method according to claim 9, wherein the depollution means comprise a NOx trap.

13. Method according to claim 9, wherein the fuel comprises an additive intended to be deposited, with the particles with which it is mixed, on the depollution means to facilitate their regeneration.

14. Method according to claim 9, wherein the fuel comprises an additive forming NOx trap.

15. Method according to claim 9, wherein the depollution means are impregnated with an SCR formulation ensuring a CO/HC oxidation function.

16. Method according to claim 9, wherein the engine is associated with a turbo-compressor.

17. System according to claim 1, wherein the different weighting coefficients take into account the more or less important dilution of the oil during application of these different strategies.

18. System according to claim 1, wherein the different weighting coefficients are selected depending on the state of the engine.

19. Method according to claim 9, wherein the different weighting coefficients take into account the more or less important dilution of the oil during application of these different strategies.

20. Method according to claim 9, wherein the different weighting coefficients are selected depending on the state of the engine.

* * * * *